April 9, 1935.  F. GOSSLAU ET AL  1,997,173
COOLING ARRANGEMENTS FOR INTERNAL COMBUSTION ENGINES
Filed Aug. 2, 1932  3 Sheets-Sheet 1
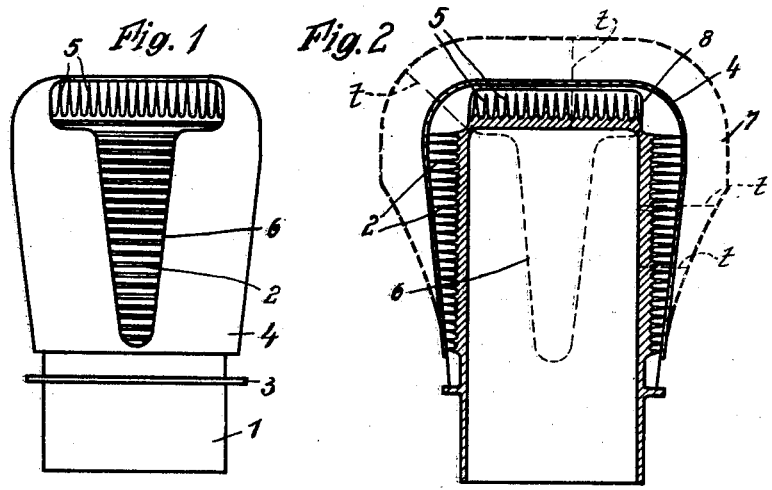
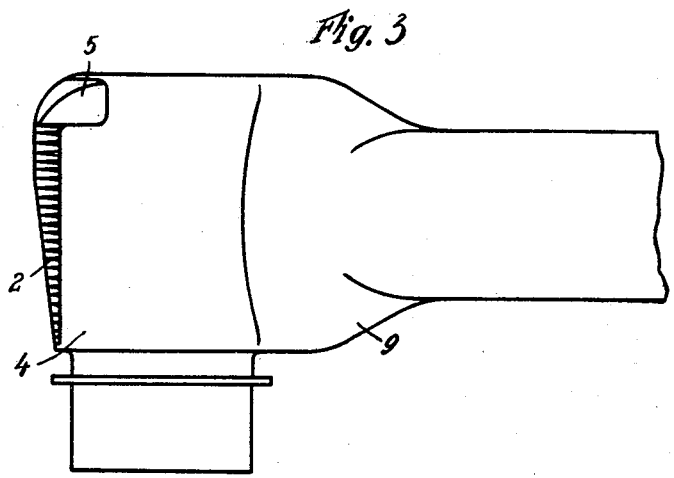
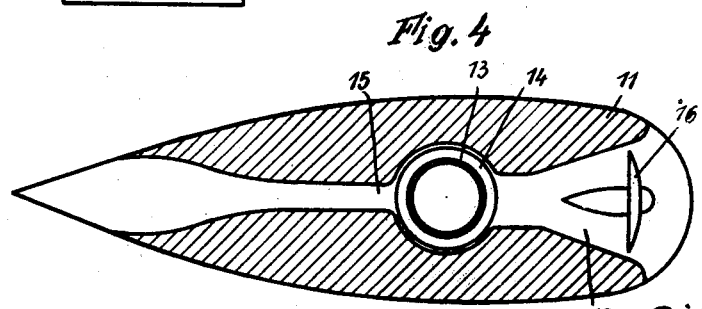

April 9, 1935.  F. GOSSLAU ET AL  1,997,173

COOLING ARRANGEMENTS FOR INTERNAL COMBUSTION ENGINES

Filed Aug. 2, 1932  3 Sheets-Sheet 2

C-D

Fritz Gosslau
Johannes Lugmat
Inventors,
by Knight
Attys.

April 9, 1935.  F. GOSSLAU ET AL  1,997,173
COOLING ARRANGEMENTS FOR INTERNAL COMBUSTION ENGINES
Filed Aug. 2, 1932  3 Sheets-Sheet 3
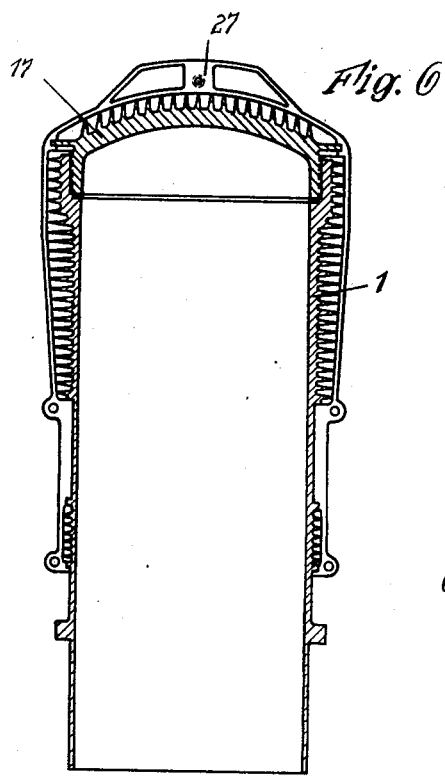
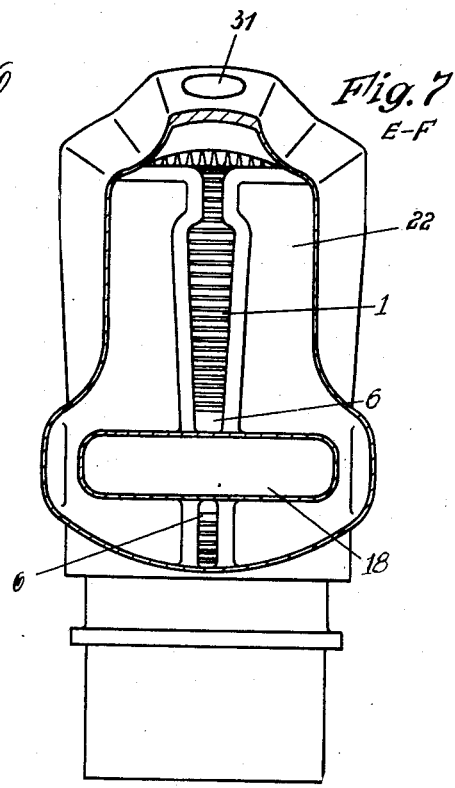
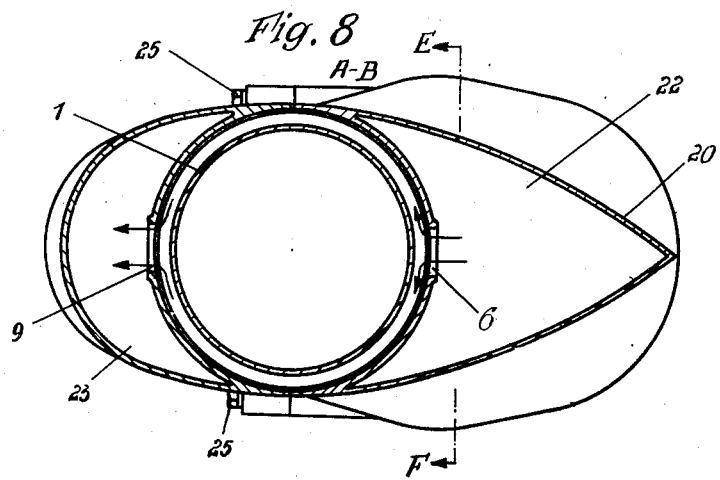

Patented Apr. 9, 1935

1,997,173

UNITED STATES PATENT OFFICE 1,997,173

COOLING ARRANGEMENTS FOR INTERNAL COMBUSTION ENGINES

Fritz Gosslau, Berlin-Charlottenburg, and Johannes Lusznat, Berlin-Haselhorst, Germany, assignors to Siemens & Halske, Aktiengesellschaft, Siemensstadt, near Berlin, Germany, a corporation of Germany Application August 2, 1932, Serial No. 627,248
In Germany August 8, 1931

10 Claims. (Cl. 123—171)

Our invention relates to improvements in cooling arrangements for internal combustion engines, and more particularly to a cooling arrangement for reducing the power required for air cooling radially stationary cylinder aeroengines.

In the competition between air-cooled and water-cooled internal combustion engines, the air-cooled engine is often considered as being disadvantageous owing to the great air resistance brought about by the cylinders. While only the radiator of liquid-cooled engines is exposed to the strong current of air during the flight, and absorbs in the most favorable case about 7 per cent of the propeller power, it has not been possible to obtain for air-cooled engines such a low value of the power required for cooling purposes, in spite of the numerous improvements hitherto made. Corresponding conditions are also present in stationary internal combustion engines.

The object of our invention is to provide a cooling arrangement whereby the power necessary for air cooling internal combustion engines is reduced even below the value of that necessary for cooling water-cooled engines.

The invention is based on the fact, that the difference in temperature between an air-cooled cylinder and the cooling air is materially greater than the temperature difference between the radiator liquid and the cooling air in a liquid-cooled engine, because of the inefficient heat exchange between the cylinder walls and the liquid in the latter type of engine as compared with the much more efficient heat exchange between the radiating elements of an air-cooled cylinder directly with the cooling air. Numerically the average temperature of an air-cooled cylinder may be estimated at 180° C., and that of the liquid in the radiator in the most favorable case (when using ethylene glycol) at 120° C.

Besides, in a liquid-cooled cylinder very large amounts of liquid must be circulated in order to avoid overheating the hottest parts of the cylinder, for instance the head, amounts which are much too large for the normally cooler cylinder portions to which they are incidentally supplied, and which therefore constitute a waste of circulating energy.

By properly designing the radial dimensions of the cooling fins and by a sufficient supply of cooling medium to be circulated around the cooling fins, it is possible to carry off the heat in air-cooled cylinders in accordance with the temperature prevailing at the different points thereof. According to the invention this may be accomplished by dimensioning the inlet or outlet opening of a substantially conical cooling jacket enclosing the cooling fins of decreasing cross-section in such a manner as to permit at the cylinder head the passage of a greater amount of cooling air than at the lower end thereof.

Our invention is illustrated in the accompanying drawings forming part of this application in which Fig. 1 is a front elevational view of an internal combustion engine cylinder embodying our invention.

Fig. 2 is a central vertical section through Fig. 1, including a curve showing relatively the temperature conditions prevailing in different horizontal sections of the cylinder.

Fig. 3 is a side elevation of Fig. 1.

Fig. 4 is a sectional plan view showing a modified form of the air-cooling jacket of Fig. 1.

Fig. 6 is a central vertical section at right angles to the section of Fig. 5.

Fig. 7 is a rear elevation of the cylinder shown in Fig. 5, partly in section taken on the line E—F of Fig. 8.

Fig. 8 is a sectional plan view taken on the line A—B of Fig. 5.

Figure 5:
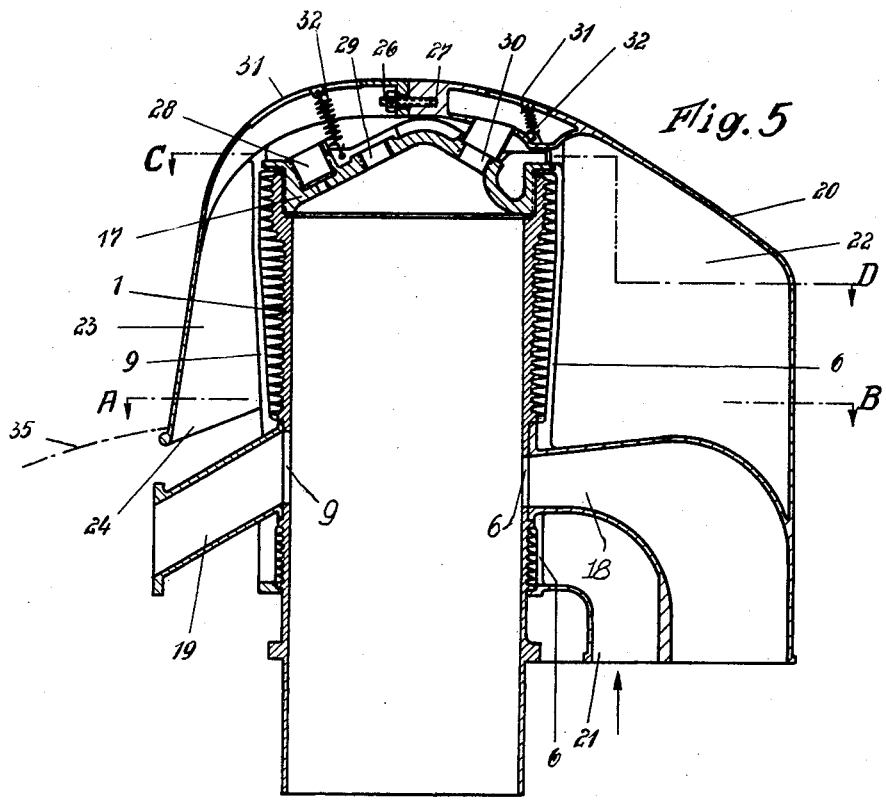
Fig. 5 is a central vertical section in larger scale through an engine cylinder showing another embodiment of the invention including a cowl arranged over the cylinder and chambers for the supply and discharge of the cooling air.

Referring to Fig. 1, the cylinder 1 is provided with circular cooling fins 2, the radial dimensions of which decrease from the cylinder head toward the flange 3, the cooling fins being enclosed in an approximately conical air-cooled jacket 4. Across the cylinder head extend the vertical cooling ribs 5. The cooling jacket has a substantially V-shaped inlet opening 6 extending longitudinally along the cylinder and having its apex near the flange 3. The form of the inlet opening 6 is carried out in accordance with the temperatures prevailing in the cylinder, the dotted curve 7 indicated in Fig. 2 showing the temperature conditions of the different sections of the cylinder. This curve is obtained by plotting radially outwardly from the inner cylinder surface the prevailing temperature values $t$ of the appertaining cylinder wall portions. The values $t$ are also indicated in dotted lines in Fig. 2. The cooling air inlet opening 6 is enlarged at the cylinder head into a rectangular form so as to expose all of the vertical cooling fins extending across the head. In this manner an overheating at the cylinder head is prevented, since a greater amount of cooling air flowing into the rectangular portion of inlet opening 6 is supplied to the hotter upper part of the cylinder and through the ducts of larger cross-section formed by the transverse top ribs 5 and the jacket than to the cooler cylinder sections, thus securing an effective cooling of the cylinder head. At the side of the cylinder opposite to inlet opening 6, a discharge duct 9 (Fig. 3) is so arranged as not to cause a whirling of discharged cooling air with outside atmosphere.

The supply of different quantities of cooling air to the cylinder need not necessarily be determined at the front portion of the cylinder facing the direction of travel, but may be effected by suitable designs at the rear portion thereof, for instance at the discharge side 15 as shown in the embodiment Fig. 4. The direction of flight is indicated by the arrow 10. The streamline body 11 serves to direct the air and to enclose the cylinder. The cooling air by reason of the dynamic pressure caused by the movement of the body 11 passes through the passage 12 and flows horizontally around the cylinder through the ducts formed by the horizontal ribs 14 and the cylinder body 13. To increase the suction effect in the passage 12 a blower 16 is provided. The arrangement and the radial dimensions of the ribs correspond to the embodiment shown in Figs. 1 and 2. Also in this case an effective cooling is brought about by the supply of different amounts of the cooling medium to the different portions of the cylinder. Such an arrangement is particularly of advantage in cases in which a sufficient supply of cooling air at the front portion of the cylinder encounters difficulties.

In the above described arrangement the height of the cooling fins decreases in a known manner from the head of the cylinder toward the flange, but according to the invention only so much cooling air is supplied to the individual strata extending at right angles to the cylinder axis as is required to carry off the heat developed in each individual cylinder stratum.

In the embodiment shown in Fig. 5, the cylinder 1 surrounded by the above described conical air cooling jacket is provided with a streamline cowl 20 and has a separate head 17. The scavenging and charging air is supplied to the cylinder 1 through the passage 18 and the port 33, the exhaust gases being discharged through the port 34 and the passage 19. The cooling air supplied by a blower passes through the passage 21 and is distributed in the space 22 behind the cylinder in the flying direction, formed by the streamline cowl 20, thence it passes through the opening 6 (similar to that shown at 6 in Fig. 1) and is deflected around the sides of the cylinder 1, and enters through the oppositely disposed opening 9 the space 23 formed in front of the cylinder 1 by a streamline cowl. The hot cooling air is then discharged at 24.

Figure 9:
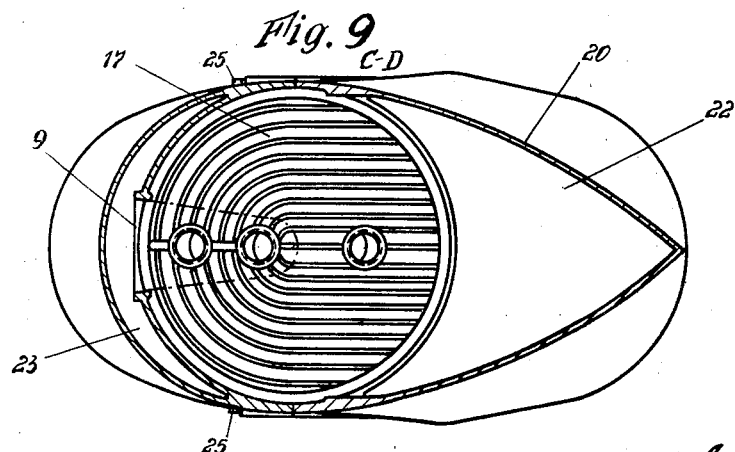
Fig. 9 is a top view, partly in section taken on the line C—D of Fig. 5.

As will be seen from Fig. 7, the width of the inlet opening 6 for the ingress of the cooling medium to be circulated around the cylinder increases from the top of the scavenging and charging duct 18 toward the hottest point of the cylinder near the top and then decreases at its upper portion. The width of the opening 6 below duct 18 is still narrower than above it, since at this point the cylinder is relatively the coolest. The amount of cooling air flowing through the inlet opening 6 corresponds, therefore, to the quantity required for cooling the different sections of the cylinder exposed to heat, thus ensuring a cooling of the cylinder at all points with the smallest possible amount of cooling air in a most effective manner. A particularly advantageous form of construction is obtained by combining the cooling air passages, the passages for the supply of the scavenging and charging air as well as the passages for the discharge of the combustion gases to a single body as is disclosed in Figs. 5, 8 and 9. In order to easily combine this body with the cylinder, it is divided into two sections along a longitudinally directed plane along the cylinder axis and at right angles to the general direction of the flow of the cooling air around the cylinder fins, as shown in Figs. 8 and 9. One section located to the rear of the cylinder contains the supply chambers and the ports for the cooling air and the scavenging air, the front section contains the exhaust ports and discharge chambers for the cooling air and the exhaust gases. The two sections are held together by the screws 25 arranged at the level of passage 18 for the scavenging air and at the level of passage 19 for the exhaust gases thus attaining at the same time a reliable joint for these passages. A further screw 26 cooperating with a shoulder 27 of the streamline cowl 20 is arranged above the cylinder head. The space between the cylinder head and the cowl is so designed as to enclose the elements required for the operation of the engine and which are arranged on the cylinder head, such as fuel nozzle 28, spark plug 29 and compressed air starting inlet 30 so that these elements do not bring about any resistance to flight in the case of the cylinder projecting into the atmosphere. These elements are, however, accessible through covers 31 held in position by means of the springs 32. As will be seen from Fig. 9 the cooling air streaming over the cylinder head is directed through the ducts between the cooling fins which are so designed formed between the inlet port and the exhaust port as to obtain as far as possible paths of equal length for the cooling air. In this manner a uniform cooling of the cylinder head is ensured. The numeral 35 in Fig. 5 denotes a portion of the supporting or wing surface of an aeroplane.

Our invention renders also possible a remarkable improvement for stationary air-cooled engines, since it eliminates a waste of cooling air in the neighborhood of the flange. In vehicles and in streamline bodies the power required for cooling purposes may be still further reduced according to the invention when employing the above described means at the inlet opening of the blower, by utilizing the dynamic pressure caused by the movement of the craft and by choosing suitable dimensions of cross-section so as to prevent a whirling of the discharged cooling air with outside atmosphere.

Further improvements which also reduce the power required for cooling purposes lie in the choice of an air cooling blower of high efficiency, for instance, of an axial blower with blades of wing-like cross-section.

We claim as our invention:

1. In an air cooling arrangement for internal combustion engine cylinders, the combination with an engine cylinder of a plurality of annular cooling fins spaced around the cylinder wall, and dimensioned in relative height proportional to the relative amounts of heat developed in the different cylinder portions adjacent to the several fins, means for supplying cooling air to said cylinder, and means for directing said air between said fins transversely to the cylinder axis and distributing it in individual amounts among said fins proportional to the relative amount of heat radiated by each fin.

2. In an air cooling arrangement for internal combustion engine cylinders, the combination with an engine cylinder of a plurality of annular cooling fins spaced around the cylinder wall, and dimensioned in relative height proportional to the relative amounts of heat developed in the different cylinder portions adjacent to the several fins, means for supplying cooling air to said cylinder, and a jacket surrounding said fins to form ducts with said fins, said jacket having axially extending air ports on diametrically opposite cylinder sides, the configuration and area of one of said ports being dimensioned so as to permit at the hotter cylinder portions correspondingly larger amounts of air to enter said ducts than at the cooler cylinder portions.

3. In an air cooling arrangement for internal combustion engine cylinders, the combination with an engine cylinder of a plurality of annular cooling fins spaced around the cylinder wall, and dimensioned in relative height proportional to the relative amounts of heat developed in the different cylinder portions adjacent to the several fins, means for supplying cooling air to said cylinder, and a jacket surrounding said fins to form ducts with said fins, said jacket having axially extending air ports on diametrically opposite cylinder sides, one of said ports being V-shaped, having its wider portion near the cylinder head, so as to permit correspondingly larger amounts of air to enter the ducts at the hotter cylinder portions than at the cooler portions.

4. In an air cooling arrangement for internal combustion engine cylinders, the combination with an engine cylinder of a plurality of annular cooling fins spaced around the cylinder wall, and dimensioned in relative height proportional to the relative amounts of heat developed in the different cylinder portions adjacent to the several fins, means for supplying cooling air to said cylinder, and a jacket surrounding said fins to form ducts with said fins, said jacket having axially extending air ports on diametrically opposite cylinder sides, one of said ports being V-shaped, having its wider portion near the cylinder head and being enlarged at the head into a rectangular shape, so as to permit correspondingly larger amounts of air to enter the ducts at the hotter cylinder portions than at the cooler portions.

5. In an air cooling arrangement for internal combustion engine cylinders, the combination with an engine cylinder of a plurality of annular cooling fins spaced around the cylinder wall, and transverse cooling fins spaced across the cylinder head and extending in the flow direction of the cooling air to be supplied, all of said fins being dimensioned in relative height proportional to the relative amounts of heat developed in the different cylinder portions adjacent to the several fins, means for supplying cooling air to said cylinder and a jacket surrounding said fins to form ducts with said fins, said jacket having axially extending air ports on diametrically opposite cylinder sides, one of said ports being V-shaped, having its wider portion near the cylinder head and being enlarged opposite the cylinder head into a substantially rectangular shape, whereby larger amounts of air are individually permitted to pass between the fins at the hotter cylinder portions than at the cooler portions.

6. In an air cooling arrangement for internal combustion engine cylinders, the combination with an engine cylinder of a plurality of annular cooling fins spaced around the cylinder wall, and dimensioned in relative height proportional to the relative amounts of heat developed in the different cylinder portions adjacent to the several fins, means for supplying cooling air to said cylinder, and a jacket surrounding said fins to form ducts with said fins, said jacket having axially extending air ports on diametrically opposite cylinder sides, one of said ports being V-shaped, having its wider portion near the cylinder head, so as to permit correspondingly larger amounts of air to enter the ducts at the hotter cylinder portions than at the cooler portions, and a stream line shaped cowl completely surrounding but spaced from said jacket and said cylinder and being divided to form two chambers located at diametrically opposite cylinder sides, each chamber enveloping one of said cooling air ports, a main cooling air supply duct and a cylinder scavenging air duct disposed in one of said chambers, means at the other chamber for discharging the cooling air, and an exhaust gas discharge duct arranged on the cylinder adjacent to said last-named chamber.

7. In an air cooling arrangement for internal combustion engine cylinders, the combination with an engine cylinder of a plurality of annular cooling fins spaced around the cylinder wall, and transverse cooling fins spaced across the cylinder head and extending in the flow direction of the cooling air to be supplied, all of said fins being dimensioned in relative height proportional to the relative amounts of heat developed in the different cylinder portions adjacent to the several fins, means for supplying cooling air to said cylinder and a jacket surrounding said fins to form ducts with said fins, said jacket having axially extending air ports on diametrically opposite cylinder sides, one of said ports being V-shaped, having its wider portion near the cylinder head and being enlarged opposite the cylinder head into a substantially rectangular shape, whereby larger amounts of air are individually permitted to pass between the fins at the hotter cylinder portions than at the cooler portions, and a stream line shaped cowl completely surrounding but spaced from said jacket and being divided to form two chambers located at diametrically opposite cylinder sides, each chamber enveloping one of said cooling air ports, a main cooling air supply duct and a cylinder scavenging air duct disposed in one of said chambers, means at the other chamber for discharging the cooling air, and an exhaust gas discharge duct arranged on the cylinder adjacent to said last-named chamber.

8. In an air cooling arrangement for internal combustion engine cylinders, the combination with an engine cylinder of a plurality of annular cooling fins spaced around the cylinder wall, and dimensioned in relative height proportional to the relative amounts of heat developed in the different cylinder portions adjacent to the several fins, means for supplying cooling air to said cylinder, and a jacket surrounding said fins to form ducts with said fins, said jacket having axially extending air ports on diametrically opposite cylinder sides, one of said ports being V-shaped, having its wider portion near the cylinder head, so as to permit correspondingly larger amounts of air to enter the ducts at the hotter cylinder portions than at the cooler portions, and a stream line shaped cowl completely surrounding but spaced from said jacket and said cylinder and being divided to form two chambers located at diametrically opposite cylinder sides, each chamber enveloping one of said cooling air ports, a main cooling air supply duct and a cylinder scavenging air duct disposed in one of said chambers, means at the other chamber for discharging the cooling air, and an exhaust gas discharge duct arranged on the cylinder adjacent to said last-named chamber, said cooling and scavenging air ducts being integral with the cowl portion forming the appertaining chamber.

9. In an air cooling arrangement for internal combustion engine cylinders, the combination with an engine cylinder of a plurality of annular cooling fins spaced around the cylinder wall, and dimensioned in relative height proportional to the relative amounts of heat developed in the different cylinder portions adjacent to the several fins, means for supplying cooling air to said cylinder, and a jacket surrounding said fins to form ducts with said fins, said jacket having axially extending air ports on diametrically opposite cylinder sides, one of said ports being V-shaped, having its wider portion near the cylinder head, so as to permit correspondingly larger amounts of air to enter the ducts at the hotter cylinder portions than at the cooler portions, and a stream line shaped cowl completely surrounding but spaced from said jacket and said cylinder and being divided to form two chambers located at diametrically opposite cylinder sides, each chamber enveloping one of said cooling air ports, a main cooling air supply duct and a cylinder scavenging air duct disposed in one of said chambers, means at the other chamber for discharging the cooling air, and an exhaust gas discharge duct arranged on the cylinder adjacent to said last-named chamber, said cooling and scavenging air ducts being integral with the cowl portion forming the appertaining chamber, and means for attaching said divided cowl to said cylinder.

10. In an air cooling arrangement for internal combustion engine cylinders, the combination with an engine cylinder of a plurality of annular cooling fins spaced around the cylinder wall, and dimensioned in relative height proportional to the relative amounts of heat developed in the different cylinder portions adjacent to the several fins, means for supplying cooling air to said cylinder, and a jacket surrounding said fins to form ducts with said fins, said jacket having axially extending air ports on diametrically opposite cylinder sides, one of said ports being V-shaped, having its wider portion near the cylinder head, so as to permit correspondingly larger amounts of air to enter the ducts at the hotter cylinder portions than at the cooler portions, and a stream line shaped cowl completely surrounding but spaced from said jacket and said cylinder and being divided to form two chambers located at diametrically opposite cylinder sides, each chamber enveloping one of said cooling air ports, a main cooling air supply duct and a cylinder scavenging air duct disposed in one of said chambers, means at the other chamber for discharging the cooling air, and an exhaust gas discharge duct arranged on the cylinder adjacent to said last-named chamber, said cooling and scavenging air ducts being integral with the cowl portion forming the appertaining chamber, and means for attaching said divided cowl to said cylinder, said two cowl portions having removable wall portions near the cylinder head to permit the attachment and detachment of cylinder accessories.

FRITZ GOSSLAU.
JOHANNES LUSZNAT.